US012590671B2

(12) United States Patent (10) Patent No.: US 12,590,671 B2
Ban (45) Date of Patent: Mar. 31, 2026

(54) COMBINED TRIPOD

(71) Applicant: UNI-WAY RESOURCE CO., LTD, Shenzhen (CN)

(72) Inventor: Zhaoming Ban, Shenzhen (CN)

(73) Assignee: UNI-WAY RESOURCE CO., LTD, Shenzhen (CN)

( * ) Notice: Subject to any disclaimer, the term of this patent is extended or adjusted under 35 U.S.C. 154(b) by 1 day.

(21) Appl. No.: 18/726,809

(22) PCT Filed: Nov. 4, 2022

(86) PCT No.: PCT/CN2022/129909
§ 371 (c)(1),
(2) Date: Jul. 4, 2024

(87) PCT Pub. No.: WO2023/142585
PCT Pub. Date: Aug. 3, 2023

(65) Prior Publication Data
US 2025/0067387 A1 Feb. 27, 2025

(30) Foreign Application Priority Data
Jan. 25, 2022 (CN) .......................... 202220201451.1

(51) Int. Cl.
*F16M 11/32* (2006.01)
*F16M 11/34* (2006.01)
(Continued)

(52) U.S. Cl.
CPC ........... *F16M 11/32* (2013.01); *G03B 17/561* (2013.01)

(58) Field of Classification Search
CPC ........ F16M 11/32; F16M 11/34; F16M 11/36; G03B 17/561; G03B 17/56; G03B 17/566; F16B 2/065
See application file for complete search history.

(56) References Cited

U.S. PATENT DOCUMENTS 1,495,458 A * 5/1924 Thalhammer .......... F16M 11/34
248/188.5
2,160,538 A * 5/1939 Cavuoti ................. F16M 11/34
248/188.91
(Continued)

FOREIGN PATENT DOCUMENTS

CN 202361018 A 8/2012
CN 204389857 A 6/2015
(Continued)

OTHER PUBLICATIONS

International search report of PCT/CN2022/129909.

*Primary Examiner* — Nkeisha Smith

(57) ABSTRACT

The present disclosure provides a combined tripod. An auxiliary frame and a main frame are combined together through a main connecting frame. When the auxiliary frame and the main frame are combined for use, the auxiliary frame is used as a center shaft and plays a role of adjusting a height; and when the auxiliary frame is separated from the main frame, two tripods with independent functions are formed. An outwards pulled buckle lock, i.e. a locking mechanism, of the main frame uses an innovative design, which is conductive for quick unfolding and folding. Three main frame legs can be as close as possible to each other, so that an occupied space is reduced. Central shaft legs of the auxiliary frame can be inserted into outer gaps between the three main frame legs; and a cross-sectional shape can be determined according to a gap envelop shape, thereby forming the most compact spatial structure. A basic structure of the auxiliary frame is a traditional structure, with a safety tail plug designed at a tail end to prevent accidental separation and slippage of the auxiliary frame.

8 Claims, 16 Drawing Sheets

(51) Int. Cl.
  *F16M 11/36* (2006.01)
  *G03B 17/56* (2021.01)

(56) References Cited

U.S. PATENT DOCUMENTS

| | | | | |
|---|---|---|---|---|
| 4,015,806 | A * | 4/1977 | Cattermole | F16M 11/242 |
| | | | | 248/431 |
| 4,223,860 | A * | 9/1980 | Prest | A47B 91/16 |
| | | | | 108/150 |
| 5,836,516 | A * | 11/1998 | Van Epps | B05B 15/625 |
| | | | | 239/281 |
| 6,688,566 | B1 * | 2/2004 | Crain | G01C 15/00 |
| | | | | 248/168 |
| 7,984,884 | B1 * | 7/2011 | Iliev | A47G 33/12 |
| | | | | 248/527 |
| 9,057,935 | B2 * | 6/2015 | Vieira Caeiro Dias Antunes | ....... |
| | | | | F16M 13/04 |
| 11,339,916 | B2 * | 5/2022 | Smith | F16M 11/10 |
| 12,085,415 | B2 * | 9/2024 | Gabbard | G01D 11/30 |
| 2003/0178538 | A1 * | 9/2003 | Hasloecher | F16M 13/02 |
| | | | | 248/168 |
| 2011/0031358 | A1 * | 2/2011 | Fischer | F16M 11/36 |
| | | | | 248/168 |
| 2011/0122605 | A1 * | 5/2011 | Deighton | F16M 11/10 |
| | | | | 362/183 |
| 2014/0165757 | A1 * | 6/2014 | Lutz | F16M 11/18 |
| | | | | 74/412 R |
| 2016/0131303 | A1 | 5/2016 | Hubbs | |
| 2017/0314729 | A1 * | 11/2017 | Torbitt | G03B 15/02 |
| 2018/0156379 | A1 * | 6/2018 | Rosskopf | F16M 11/32 |
| 2019/0056060 | A1 * | 2/2019 | Decker | F41A 23/30 |
| 2020/0272031 | A1 * | 8/2020 | Zhu | F16M 11/16 |
| 2020/0363008 | A1 * | 11/2020 | Jankura | F16M 11/04 |
| 2020/0363703 | A1 * | 11/2020 | Jankura | F16M 11/14 |
| 2024/0200716 | A1 * | 6/2024 | Li | F16M 11/32 |
| 2024/0309989 | A1 * | 9/2024 | Zou | G03B 17/561 |
| 2025/0084959 | A1 * | 3/2025 | Gorden | F16M 11/34 |
| 2025/0164066 | A1 * | 5/2025 | Xu | F16M 11/245 |

FOREIGN PATENT DOCUMENTS

| | | |
|---|---|---|
| CN | 204533995 A | 8/2015 |
| CN | 114413129 PX | 4/2022 |
| CN | 217152531 PX | 8/2022 |
| CN | 217178014 PX | 8/2022 |
| CN | 217463948 PX | 9/2022 |

* cited by examiner

COMBINED TRIPOD

TECHNICAL FIELD

The present disclosure relates to the technical field of photography, videography, and measurement, and in particular, to a combined tripod.

BACKGROUND

A tripod is a fixing and angle adjustment tool composed of a main frame and three leg tubes and connected to a tripod head to place a camera, a vidicon, and other instruments.

At present, the utilization rate of a space in the tripod is low, and it is not conducive for storage.

SUMMARY

The present disclosure aims to overcome the shortcomings in the prior art and provides a combined tripod, which fully uses a space in the tripod and is convenient for storage.

In order to achieve the above objective, the present disclosure provides the following technical solutions:

The present disclosure provides a combined tripod. A son frame and a mother frame are combined together through a main connecting frame. When the son frame and the mother frame are combined for use, the son frame is used as a center shaft and plays a role of adjusting a height; and when the son frame is separated from the mother frame, two tripods with independent functions are formed. An outwards pulled buckle lock, i.e. a locking mechanism, of the main frame uses an innovative design, which is conductive for quick unfolding and folding.

Three main frame legs can be as close as possible to each other, so that an occupied space is reduced. Central shaft legs of the auxiliary frame can be inserted into outer gaps between the three main frame legs; and a cross-sectional shape can be determined according to a gap envelop shape, thereby forming the most compact spatial structure.

A basic structure of the auxiliary frame is a traditional structure, with a safety tail plug designed at a tail end to prevent accidental separation and slippage of the auxiliary frame.

A Y-shaped supporting frame is arranged among the three central shaft legs. For combined use, the stiffness and parallelism of the three legs are ensured. For separate use, the Y-shaped supporting frame is screwed into the top of the main frame to be abutted with a tripod head.

The basic structure of the main frame is the same as that of a traditional tripod and includes telescopic supporting legs.

The main connecting frame drives three independent wedge-shaped sheets to rise and fall in three wedge-shaped holes through a rotating ring, so as to combine and separate outer walls of central shaft legs to lock and release the son frame.

The outwards pulled buckle lock of the main frame achieves quick locking and releasing of the main frame legs.

DETAILED DESCRIPTION OF THE EMBODIMENTS

Figure 1:
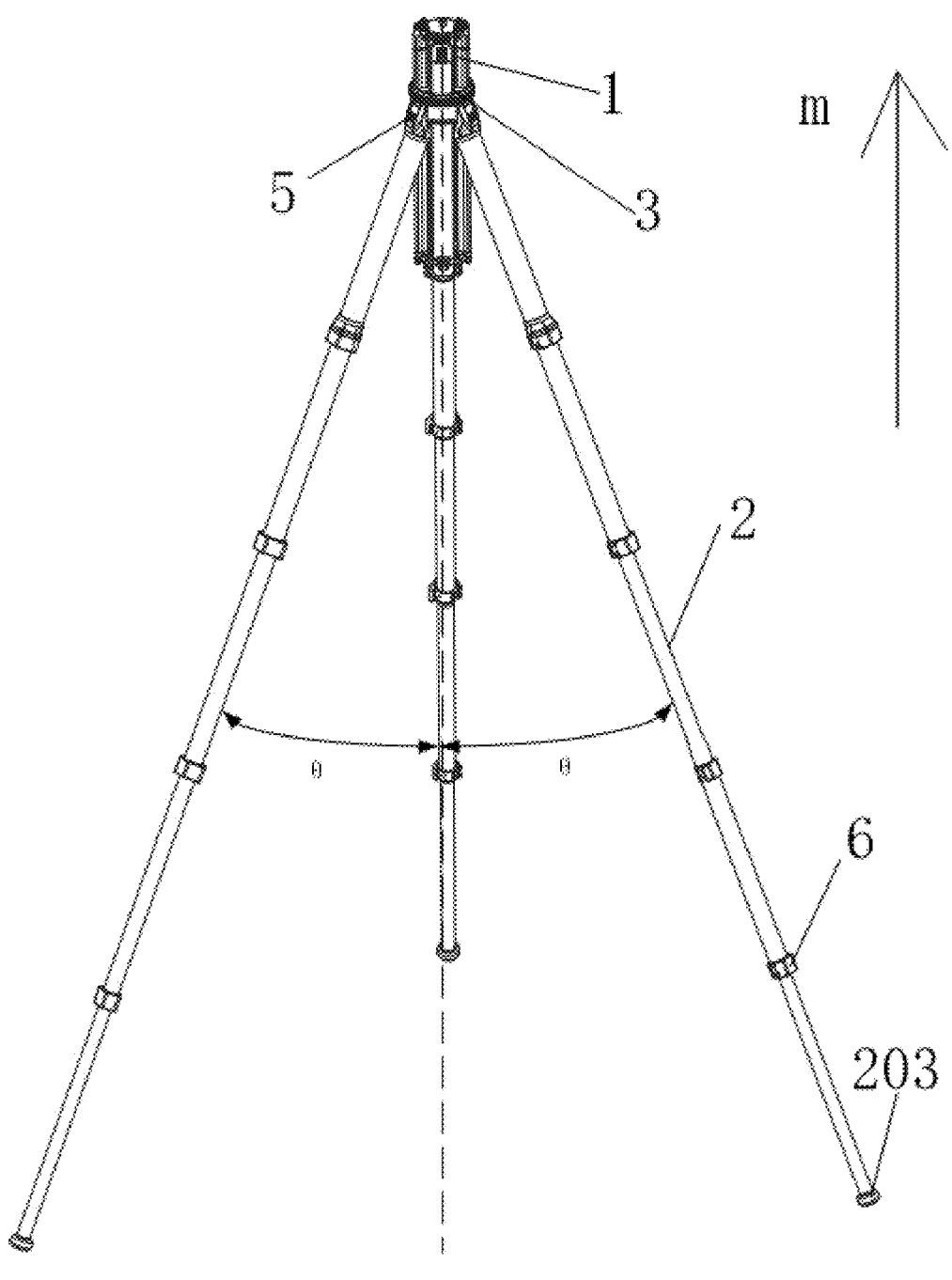
FIG. 1 is a schematic structural diagram of a combined tripod.

To make the objectives, technical solutions, and advantages of the present disclosure clearer, the following is a further detailed explanation of the present disclosure in conjunction with the accompanying drawings. It should be understood that the specific embodiments described here are only intended to explain the present disclosure and are not intended to limit the present disclosure.

Referring to FIG. 1 to FIG. 4, a combined tripod includes an auxiliary frame 1 that plays a role of a central shaft, and a main frame 2. The auxiliary frame 1 and the main frame 2 are combined together through a main connecting frame 3.

One end of the auxiliary frame 1 is interpenetrated with the main connecting frame 3; the auxiliary frame 1 can move back and forth in an m-axis direction; a Y-shaped supporting frame 4 configured to ensure the stiffness and parallelism of the auxiliary frame 1 is mounted at the other end of the auxiliary frame 1;

the main frame 2 and the main connecting frame 3 adjust or fix an unfolding angle ($\theta$) through a rotating member 5; the main frame 2 completes extension and retraction states through an outwards pulled buckle lock 6; and the three central shaft legs 101 are uniformly arranged on outer sides of the three main frame legs 201. A main combination method is as described in FIG. 16 to FIG. 20.

Figure 7:
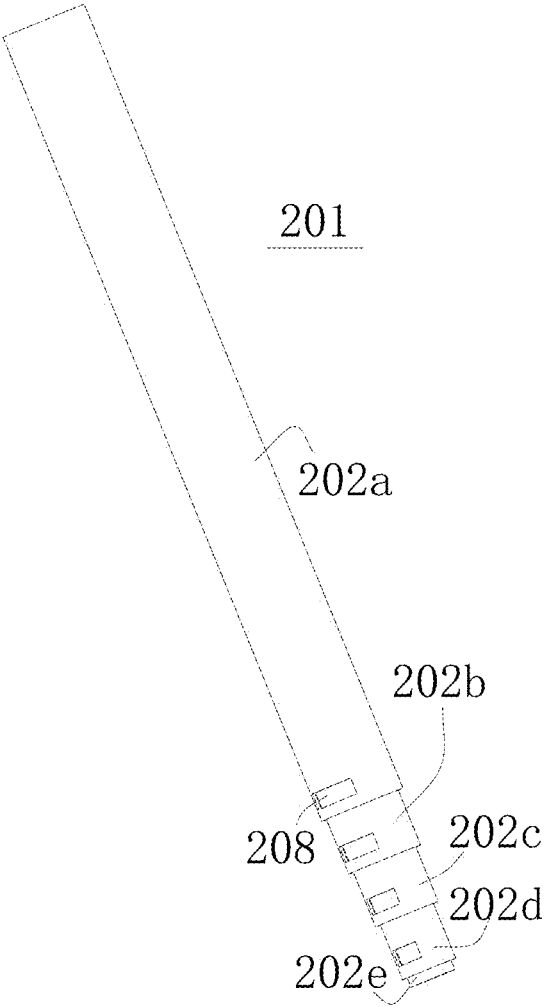
FIG. 7 is a schematic structural diagram of a main frame leg.
Figure 8:
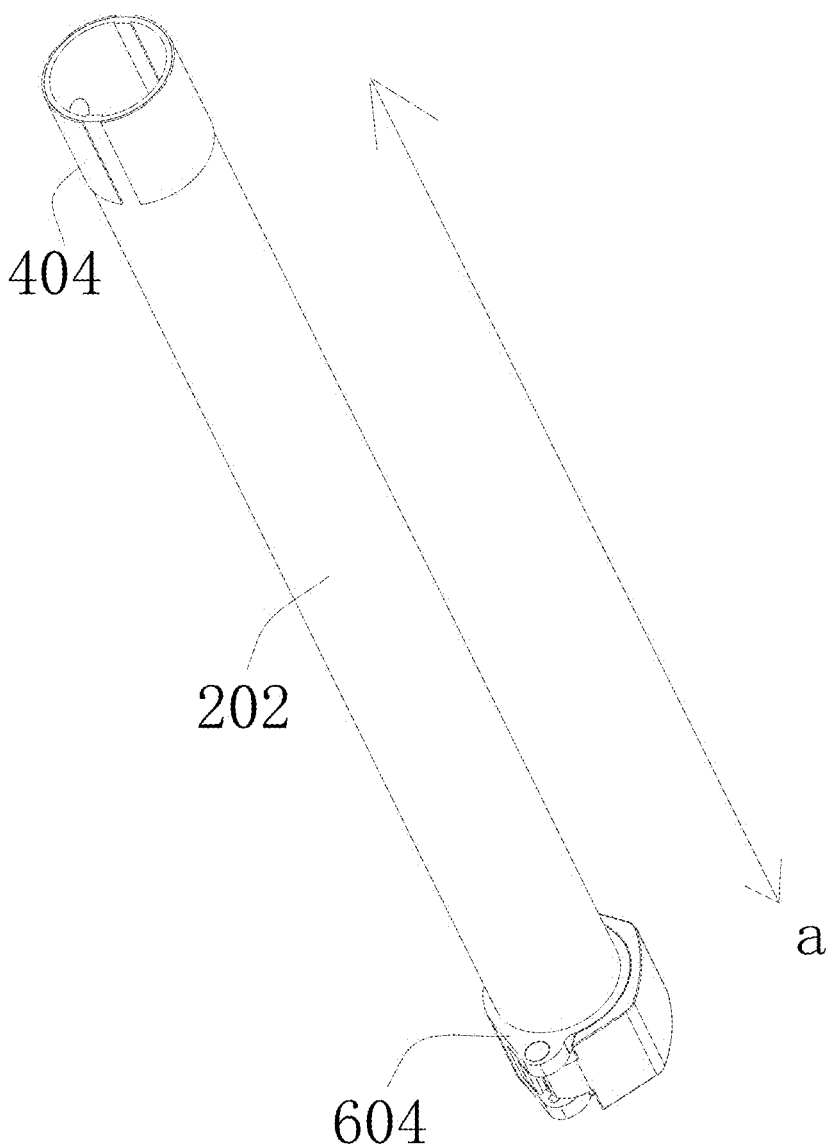
FIG. 8 is a schematic structural diagram of mounting of a telescopic leg and an integrated elastic outer ring.
Figure 9:
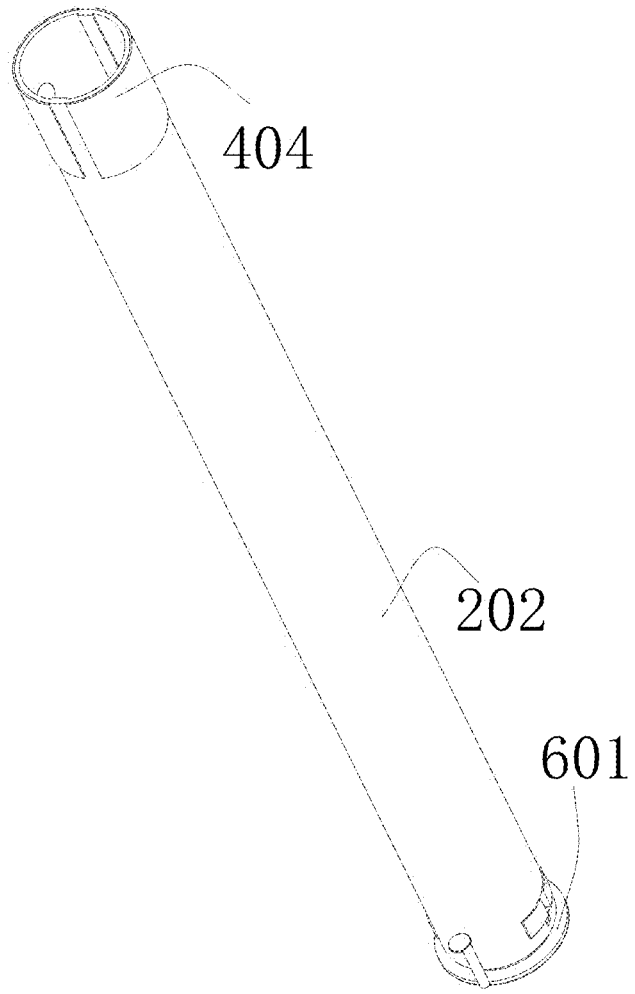
FIG. 9 is a schematic structural diagram of mounting of a telescopic leg and a bush.
Figure 10:
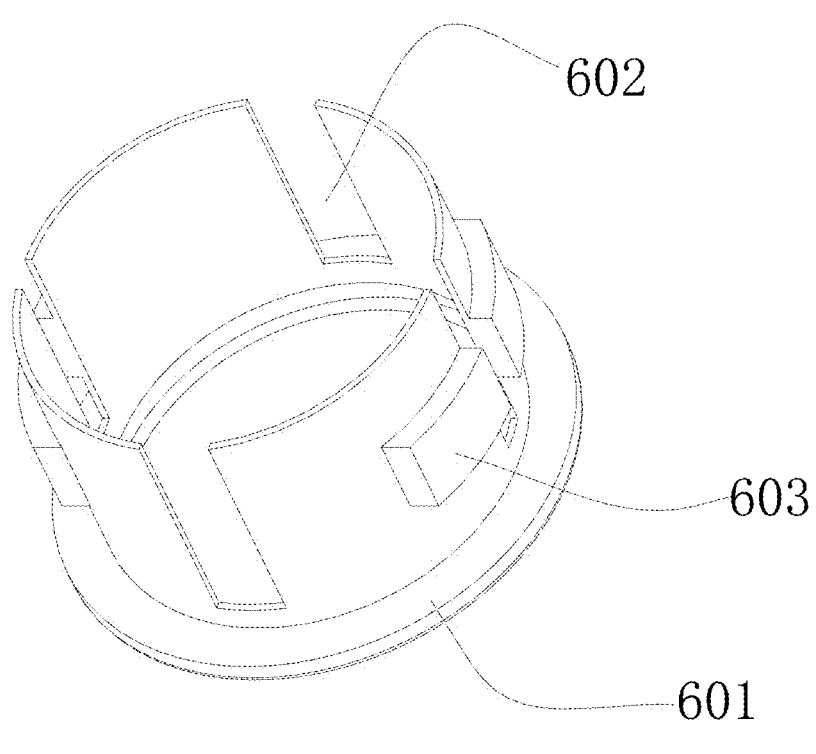
FIG. 10 is a schematic structural diagram of a bush.
Figure 11:
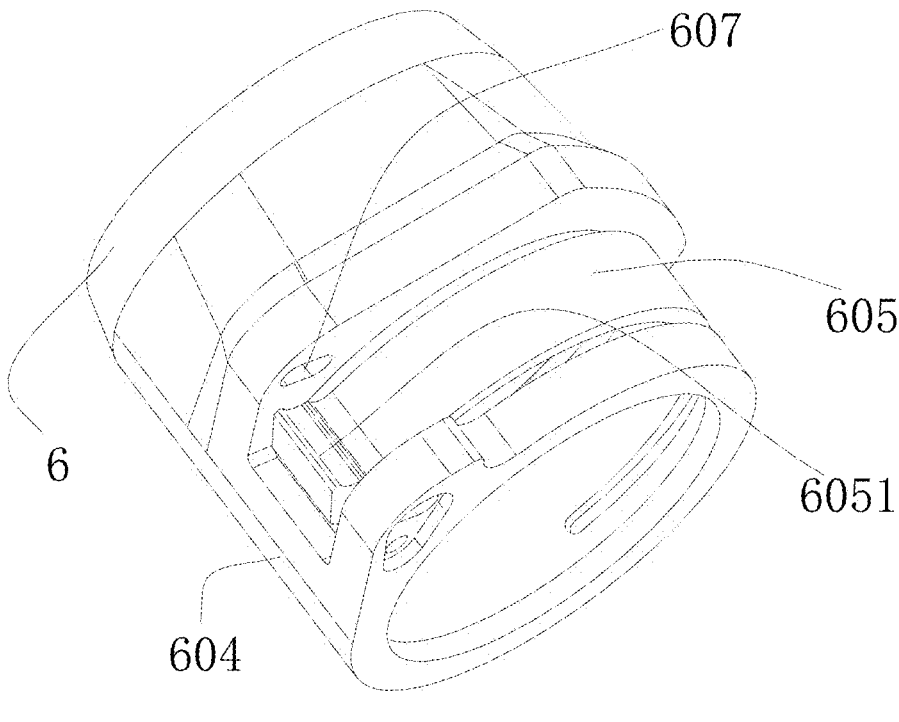
FIG. 11 is a schematic structural diagram of an outwards pulled buckle lock and a main frame leg.
Figure 12:
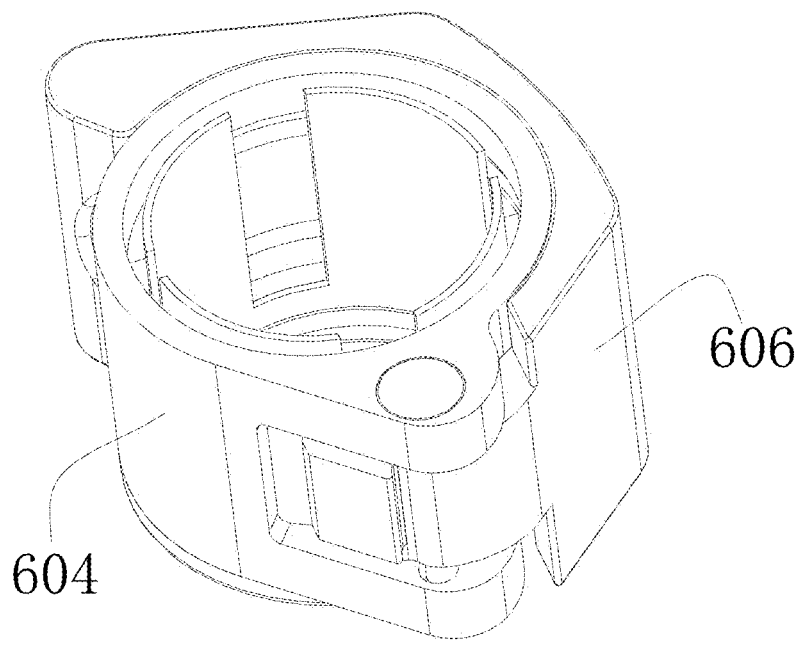
FIG. 12 is a schematic structural diagram of an outwards pulled buckle lock.
Figure 13:
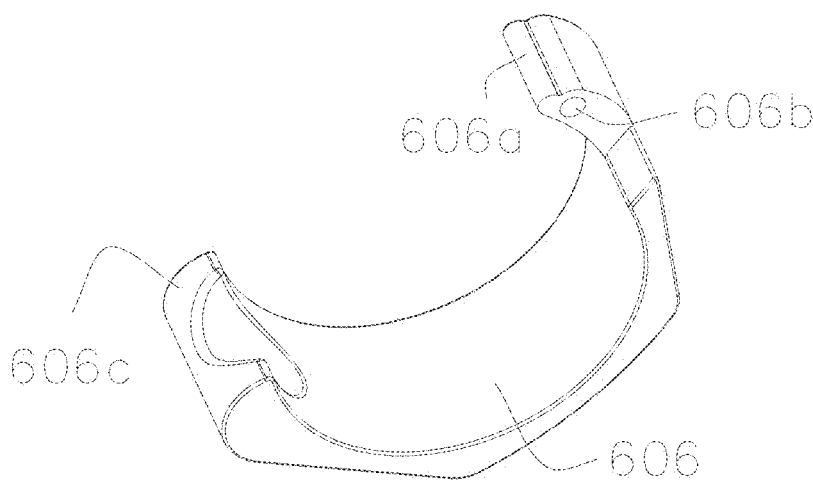
FIG. 13 is a schematic structural diagram of a pulled buckle arm.

Referring to FIG. 7, the main frame (2) includes three main frame legs 201; each main frame leg 201 includes a plurality of telescopic legs 202 that coaxially sleeve each other and can extend and retract in a lengthwise direction of the main frame leg 201; intersections of adjacent telescopic legs 202 are connected by the outwards pulled buckle lock 6;

a bottom end of the telescopic leg 202 at the bottommost end is sleeved with a tube foot 203; and a top end of the telescopic leg 202 at the topmost end is movably connected to the main connecting frame 3 through the rotating member 5.

In a possible implementation, there are five telescopic legs 202. A first telescopic leg 202a sleeves a second telescopic leg 202b; the second telescopic leg 202b sleeves a third telescopic leg 202c; the third telescopic leg 202c sleeves a fourth telescopic leg 202d; and the fourth telescopic leg 202d sleeves a fifth telescopic leg 202e.

Furthermore, the second telescopic leg 202b, the third telescopic leg 202c, the fourth telescopic leg 202d, and the fifth telescopic leg 202e all can move back and forth in a lengthwise direction of the first telescopic leg 202a. Thus, the telescopic legs 202 can extend or retract.

In a possible implementation, there are five telescopic legs 202. The five telescopic legs 202 are a first telescopic leg 202a, a second telescopic leg 202b, a third telescopic leg 202c, a fourth telescopic leg 202d, and a fifth telescopic leg 202e. One end of the fifth telescopic leg 202e away from the fourth telescopic leg 202d is sleeved with a tube foot 203; and one end of the first telescopic leg 202a away from the second telescopic leg 202b is movably connected to the main connecting frame 3 through the rotating member 5.

Referring to FIG. 8 to FIG. 13, the outwards pulled buckle lock 6 includes an integrated elastic outer ring 604; the integrated elastic outer ring 604 sleeves end a of each telescopic leg 202; the integrated elastic outer ring 604 includes an elastic band 605; an elastic band fulcrum bulge 6051 configured to be tightened with a pulled buckle arm 606 and to fasten the telescopic leg 202 is arranged at a suspended end of the elastic band 605; and sliding slots 607 are symmetrically provided on the outwards pulled buckle lock 6 corresponding to the elastic band fulcrum bulge 6051.

A front pulled buckle arm 606a is arranged at one end, adjacent to the elastic band fulcrum bulge 6051, of the pulled buckle arm 606; a pulled buckle shaft hole 606b is provided on the front pulled buckle arm 606a; a pulled buckle tail 606c is arranged at one end of the pulled buckle arm 606 away from the elastic band fulcrum bulge 6051;

the pulled buckle shaft hole 606b is threaded through the sliding slot 607 through a rotating shaft; and a sliding stop 404 for preventing the telescopic legs 202 from being separated from each other is arranged on an outer surface of one end of each telescopic leg 202 away from the outwards pulled buckle lock 6.

The sliding stop 404 has a function of: stretching the next stage of telescopic leg 202 until an end portion of the sliding stop 404 resists against an end portion of a bush 601; and the pulled buckle arm 606 is pressed or released to fasten or unfasten the bush 601 and the corresponding telescopic leg 202, thus completing extension and retraction or fixing of the telescopic leg 202.

In a possible implementation, the rotating shaft passes through the pulled buckle shaft hole 606b and is inserted into the sliding slot 607. As the sliding slot 607 is a waist hole, the rotating shaft can move in the sliding slot 607.

Since a bulge is arranged at an end portion of the front pulled buckle arm 606a, when the rotating shaft rotates, the rotating shaft slides in the sliding slot 607. Thus, the bulge of the front pulled buckle arm 606a presses the elastic band fulcrum bulge 6051. The elastic band 605 compresses the telescopic leg 202, making the integrated elastic outer ring 604 fastened with the telescopic leg, to keep the stability between adjacent telescopic legs.

Or, the elastic band 605 and the telescopic leg keep a loose state, making the integrated elastic outer ring 604 and the telescopic leg in a loose state, to enable adjacent telescopic legs to be in a sliding state.

A motion state of a latch is as follows:

A released state: The pulled buckle arm 606 is outwards pulled. Under the action of the lever principle, the rotating shaft moves in the sliding slot 607 to a stop point. The pulled buckle arm 606 is continued to be rotated. The pulled buckle arm 606 moves back. Under the action of the elastic force of the material, the elastic band fulcrum bulge 6051 returns to a natural state. At this time, the elastic band 605 will not generate a pressure on the elastic band fulcrum bulge 6051, and adjacent telescopic legs can freely slide.

A locked state: The pulled buckle arm 606 is reversely pressed. The bulge of the front pulled buckle arm 606a is first connected to the elastic band fulcrum bulge 6051. The pulled buckle arm 606 is continued to be pressed, and the rotating shaft can be pushed to move in the sliding slot 607 to a lower fulcrum. The pulled buckle arm 606 is continued to be pressed. Under the action of the lever principle, the pulled buckle arm 606 can push the elastic band fulcrum bulge 6051 to move forwards, thus compressing the elastic band 605 to extrude the bush 601, thus locking the adjacent telescopic legs.

Figure 5:
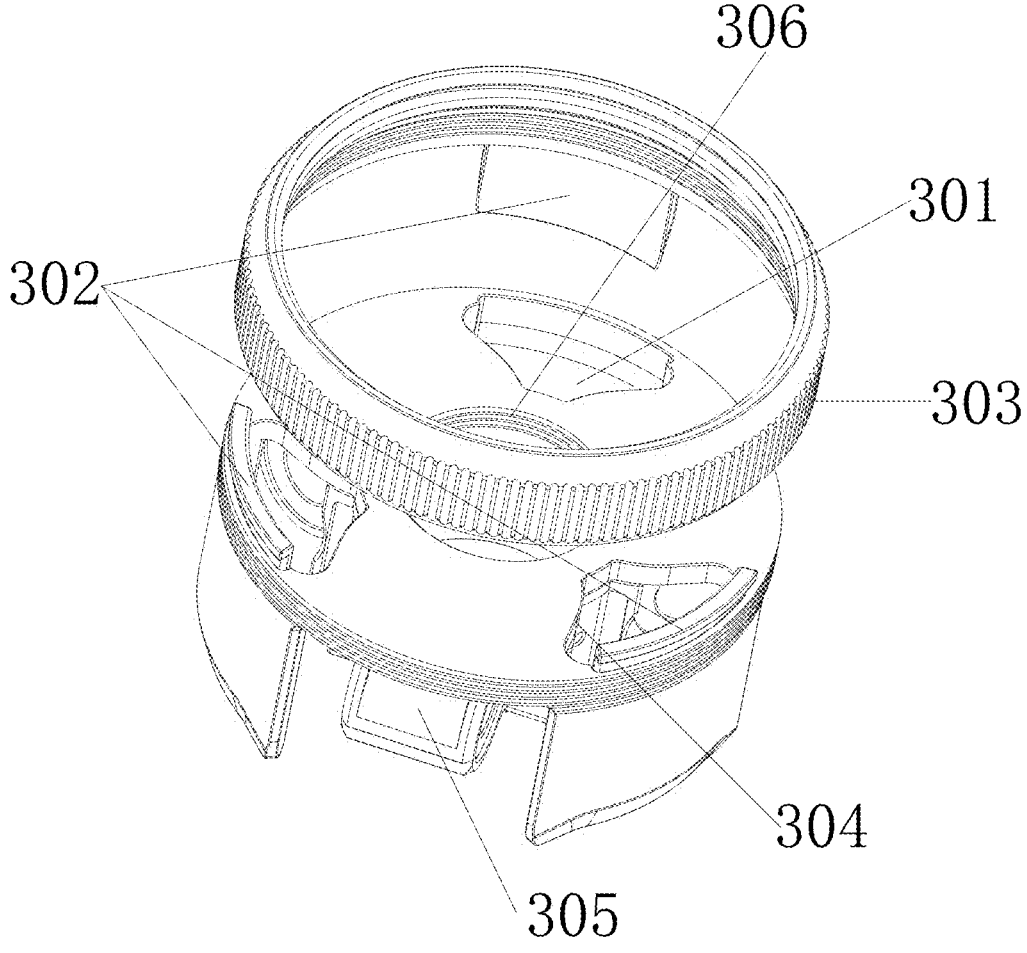
FIG. 5 is a schematic structural diagram of a main connecting frame.
Figure 6:
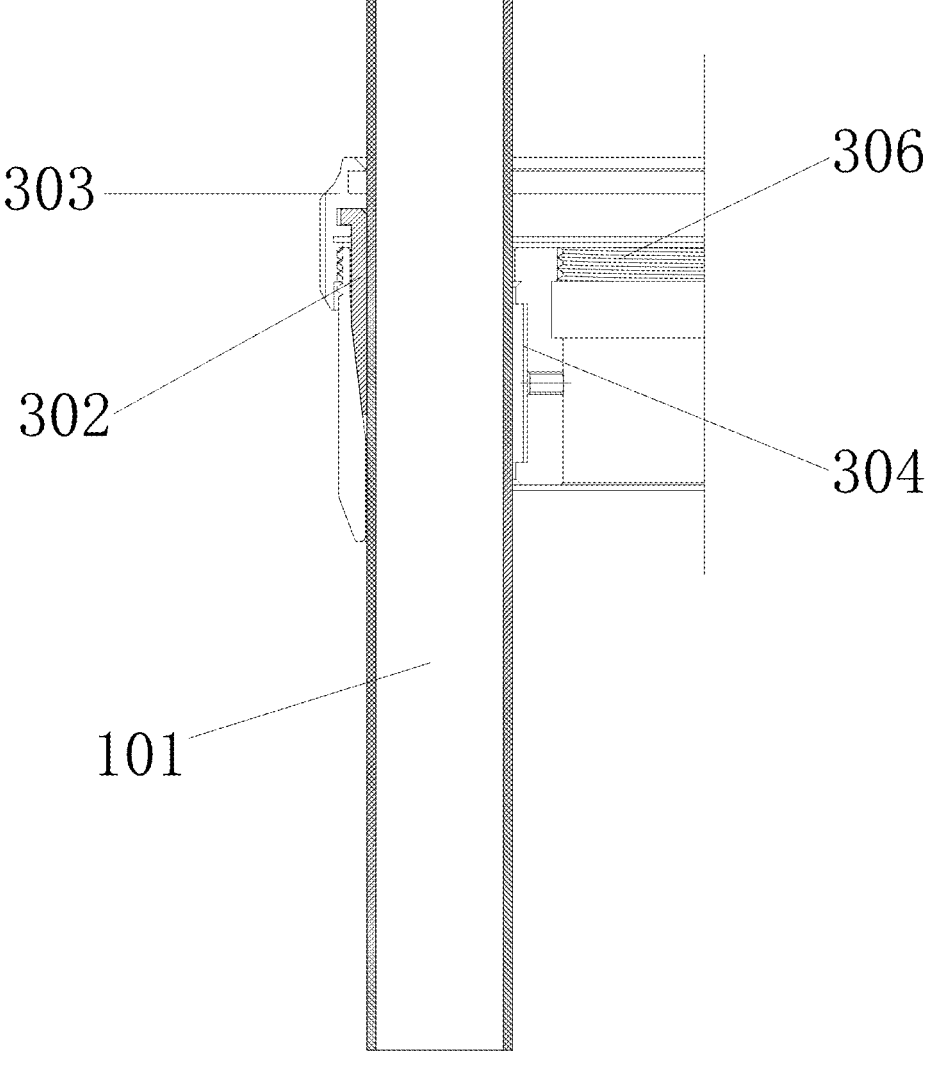
FIG. 6 is a sectional view of a main connecting frame.

Referring to FIG. 5 and FIG. 6, the auxiliary frame 1 includes three central shaft legs 101; three wedge-shaped holes 301 are distributed on the main connecting frame 3, and the three central shaft legs 101 are respectively threaded into the three wedge-shaped holes 301 in a one-to-one correspondence manner;

wedge-shaped sheets 302 are mounted in the wedge-shaped holes 301; an outer circumference of the main connecting frame 3 is rotatably sleeved with a ring sleeve 303; the wedge-shaped sheets 302 are slidably connected to an inner wall of the ring sleeve 303; and the ring sleeve 303 is rotated to push the wedge-shaped sheets 302 to move up and down. When the wedge-shaped sheets move down, due to the action of the wedge shape, the wedge-shaped sheets 302 move inwards and transversely to press the central shaft legs 101 of the auxiliary frame to an inner wall 304, thus locking the central shaft legs 101. When the wedge-shaped sheets move in a reverse direction, the central shaft legs are released.

Figure 15:
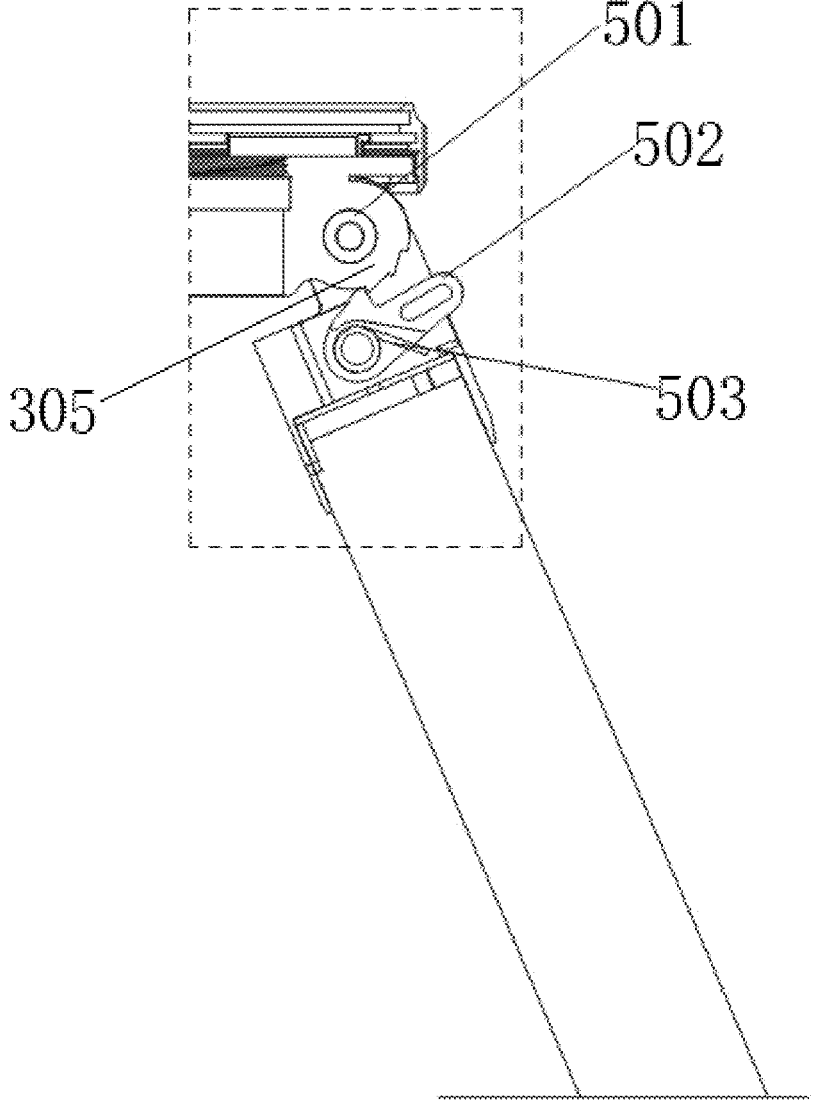
FIG. 15 is a schematic structural diagram of a rotating member.

Referring to FIG. 15, the main connecting frame 3 is provided with three hinged ratchets 305 which are respectively connected to three rotating members 5 through pin shafts 501; a pawl wrench 502 is placed in each rotating member through the pin shaft 501; a coaxial torsion spring 503 is further placed on the pin shaft to maintain a working position of the pawl wrench; a bush notch 208 that is inserted with a bush bulge 603 is arranged at end a of each telescopic leg 202; the bush bulge 603 is arranged on a bush 601; and bush seams 602 and the bush bulges 603 symmetric to and staggered from the bush seams are provided on the bush 601.

Figure 2:
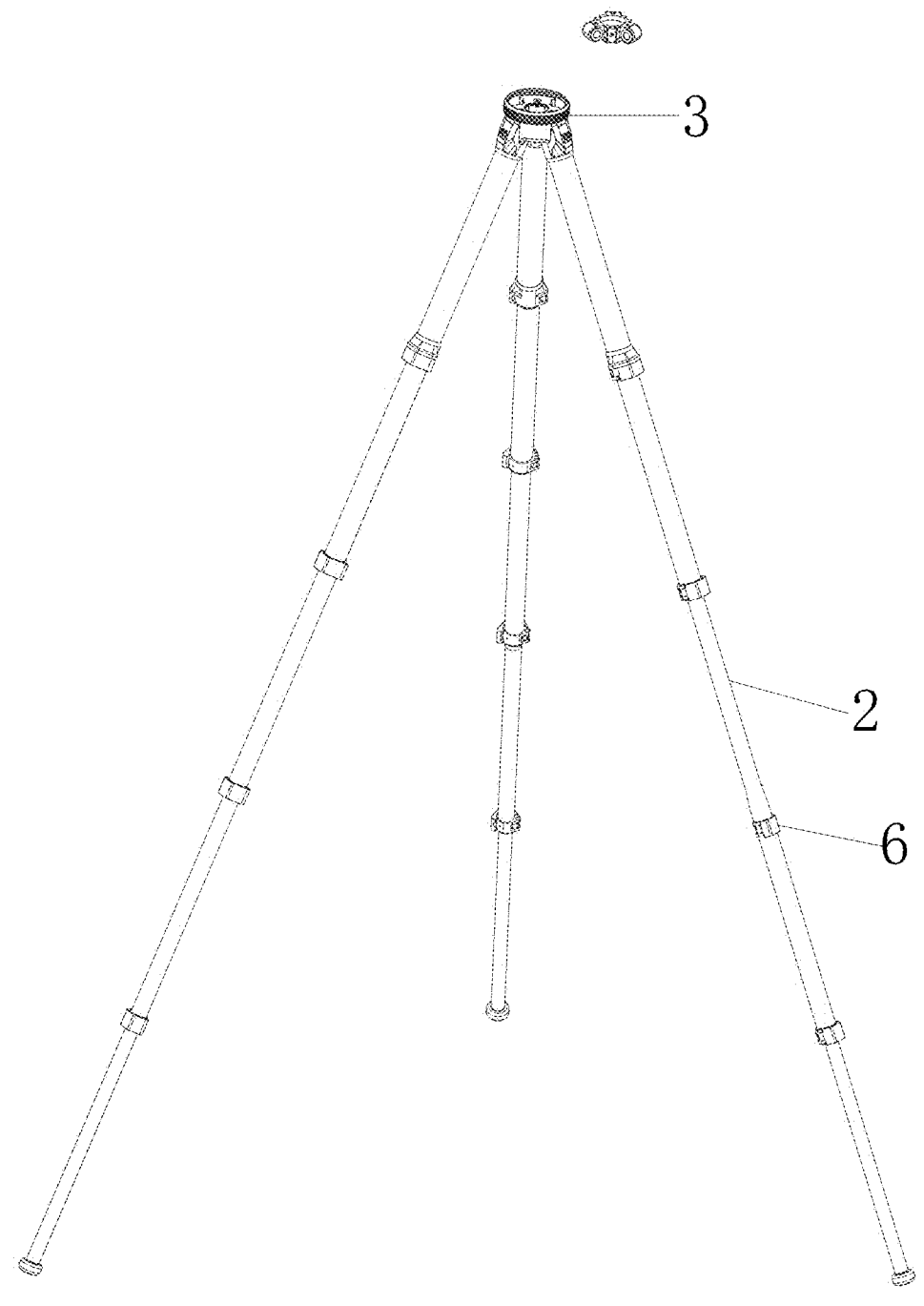
FIG. 2 is a schematic diagram I of separation of an auxiliary frame from a main frame.
Figure 3:
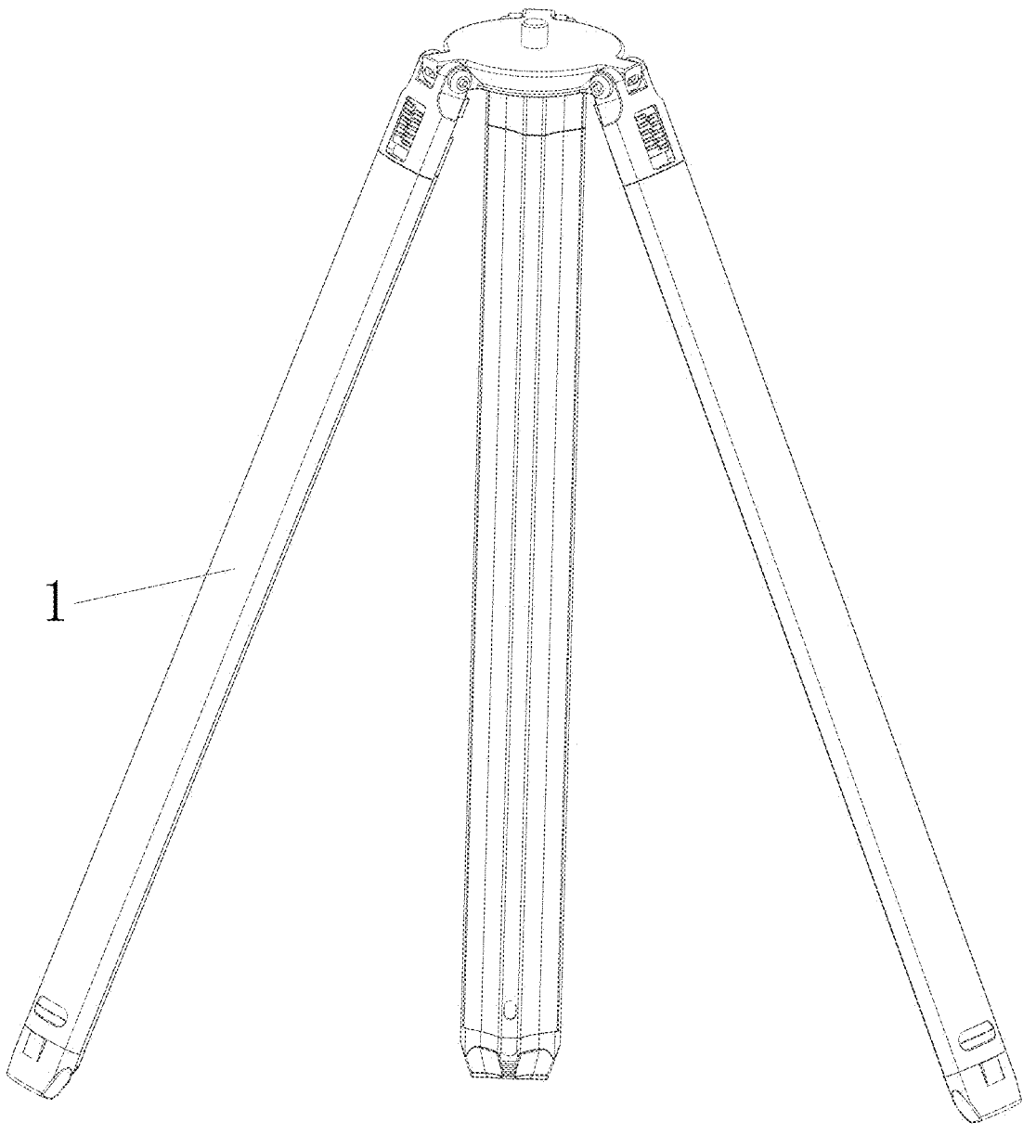
FIG. 3 is a schematic diagram II of separation of an auxiliary frame from a main frame.
Figure 4:
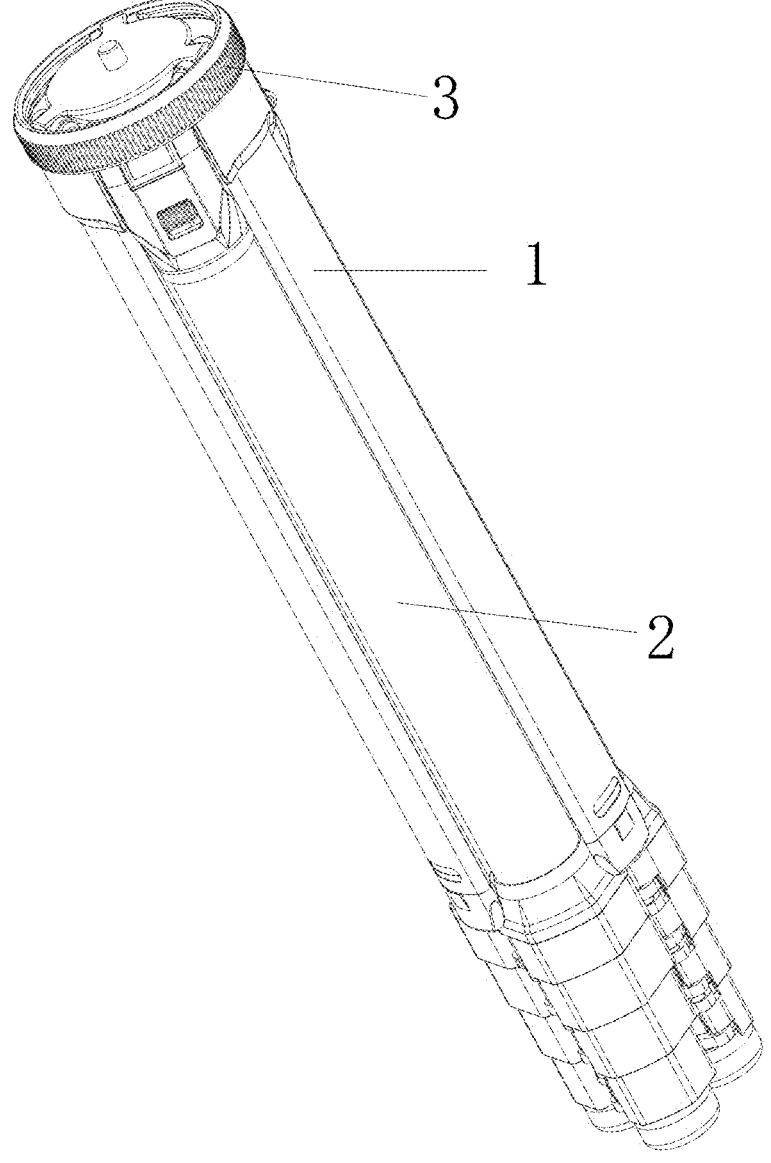
FIG. 4 is a schematic diagram of a storage state of an auxiliary frame and a main frame.
Figure 14:
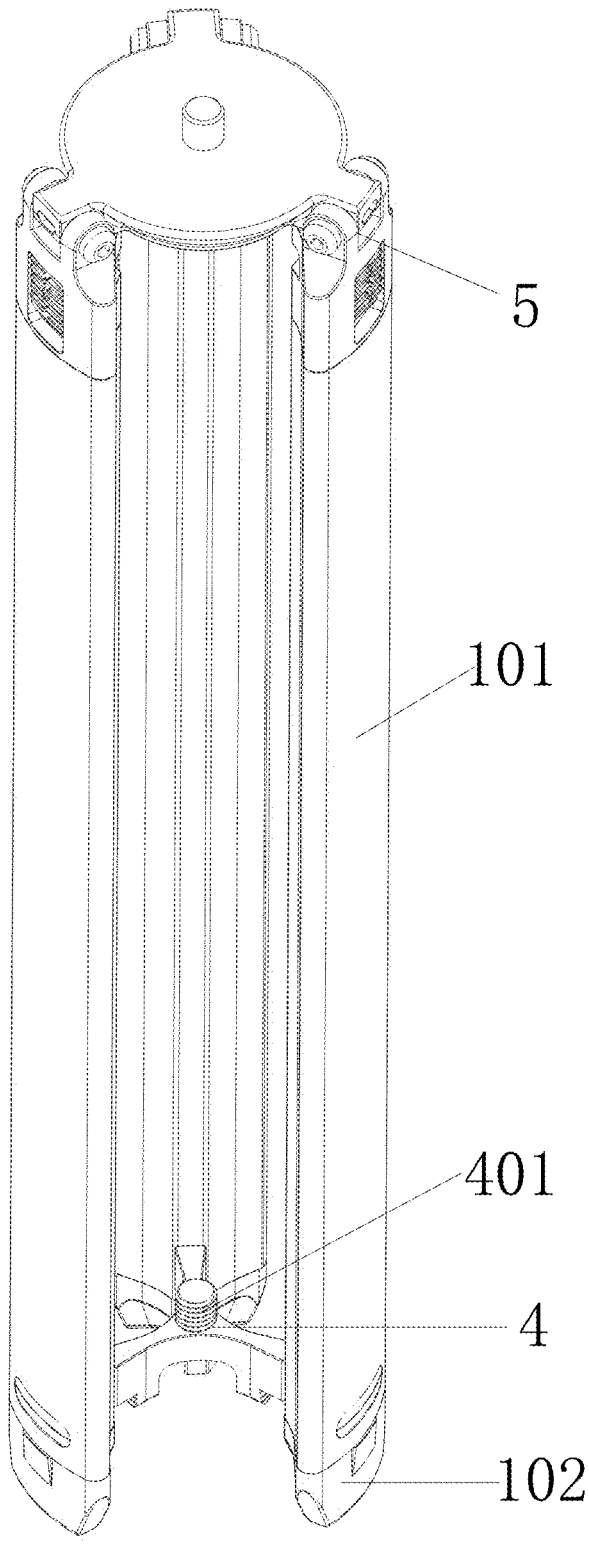
FIG. 14 is a schematic structural diagram of an auxiliary frame.

Referring to FIG. 14, FIG. 5, and FIG. 2, a Y-shaped supporting frame 4 is mounted among the three central shaft legs 101; each edge of the Y-shaped supporting frame 4 is embedded with the a safety tail plug 102 of each of the three central shaft legs 101 to provide auxiliary supporting and limiting effects on the auxiliary frame 1; and the Y-shaped supporting frame 4 is provided with abutment threads 401 that are abutted with the main frame 2, so that the main frame 2 is used as an independent tripod.

When the auxiliary frame is separated from the main frame, the Y-shaped supporting frame 4 needs to be taken out and is abutted with a thread 306 of the main connecting frame 3 to form a tripod head abutment carrier of the main frame, thus achieving that the main frame is used as an independent tripod.

Figure 16:
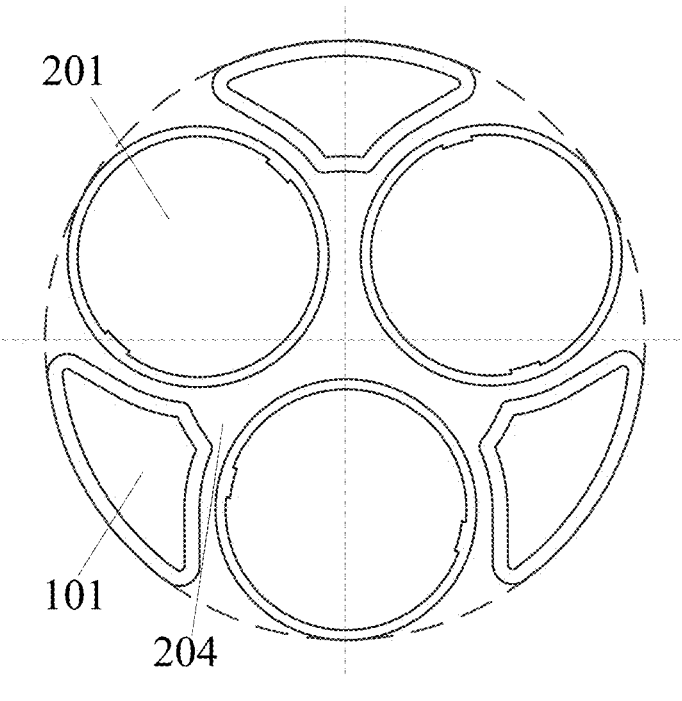
FIG. 16 is a diagram I of a position design of an auxiliary frame and a main frame.
Figure 17:
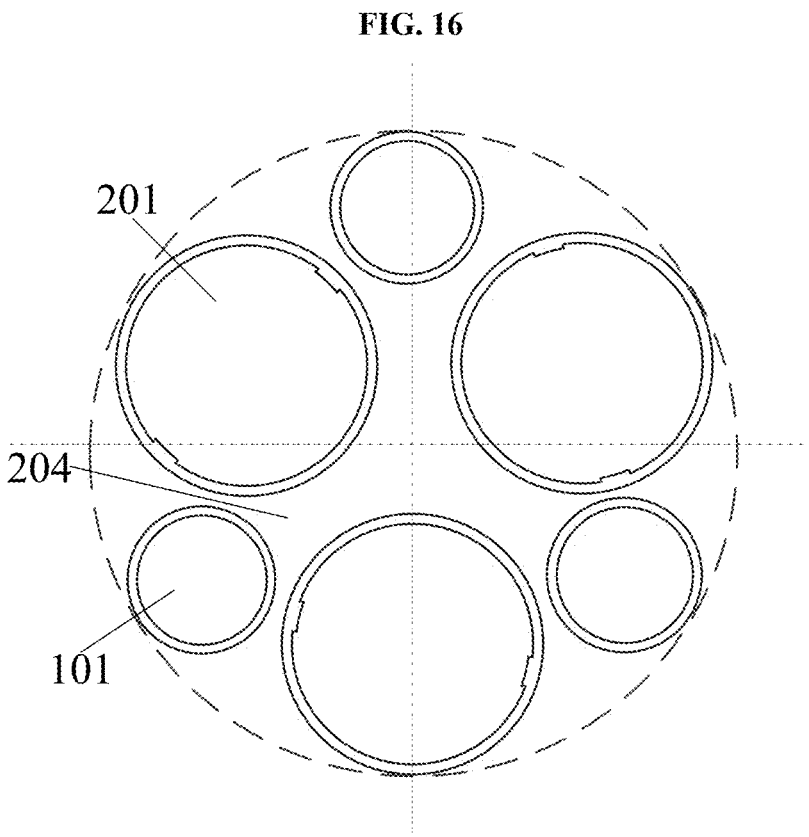
FIG. 17 is a diagram II of a position design of an auxiliary frame and a main frame.
Figure 18:
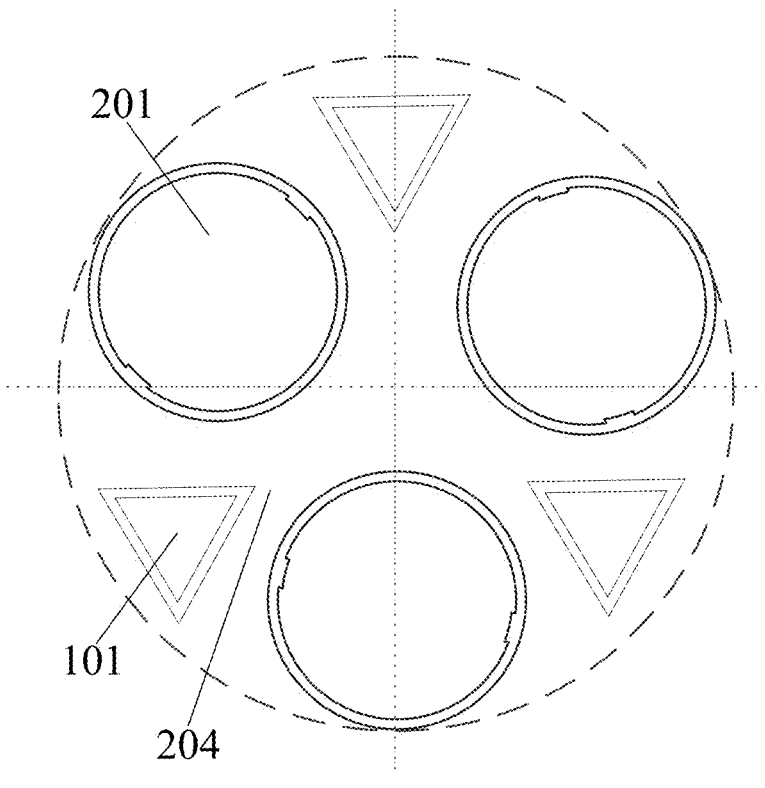
FIG. 18 is a diagram III of a position design of an auxiliary frame and a main frame.
Figure 19:
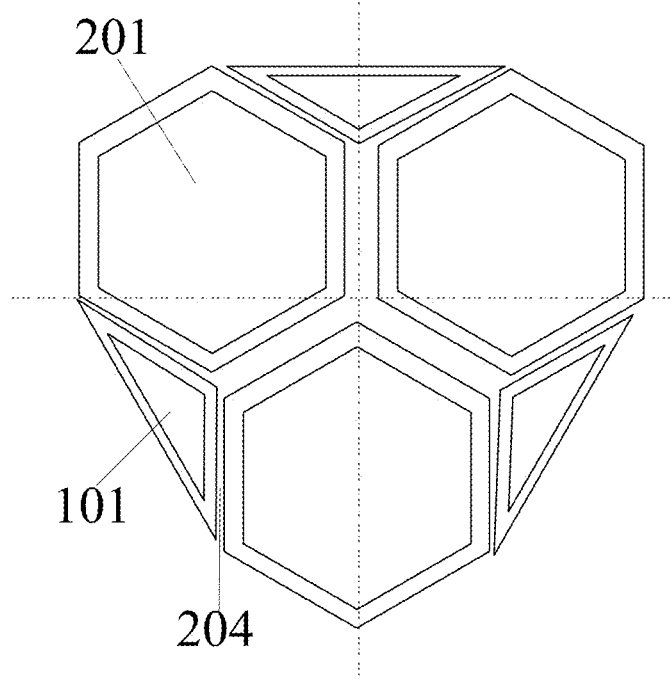
FIG. 19 is a diagram IV of a position design of an auxiliary frame and a main frame.
Figure 20:
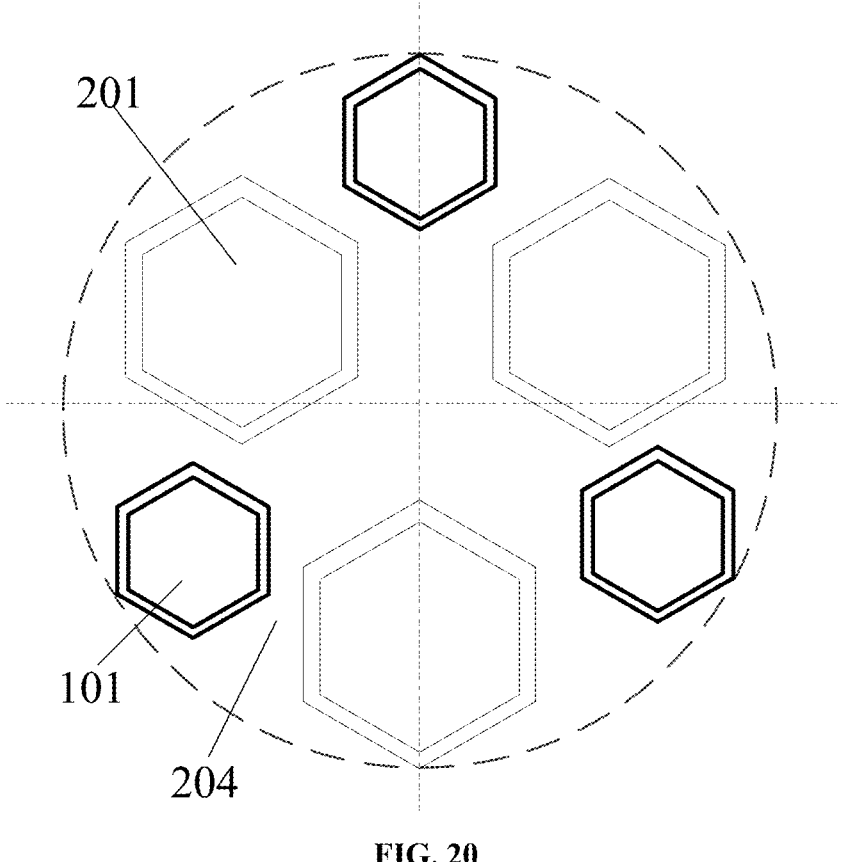
FIG. 20 is a diagram V of a position design of an auxiliary frame and a main frame.

The three central legs 101 can be inserted into side gaps 204 between the three main frame legs 201, so that the three central shaft legs 101 and the three main frame legs 201 are closely arranged in a staggered manner. Thus, the most compact spatial structure is formed. FIG. 16 and FIG. 20 show an example of a design of a cross section in the following figures.

The foregoing embodiments merely express several implementations of the present disclosure. The descriptions thereof are relatively specific and detailed, but are not understood as limitations on the scope of the present disclosure. It should be pointed out that a person of ordinary skill in the art can also make several transformations and improvements without departing from the idea of the present disclosure. These transformations and improvements fall within the protection scope of the present disclosure. Therefore, the protection scope of this patent of the present disclosure shall be subject to the appended claims.

What is claimed is:

1. A combined tripod, comprising an auxiliary frame (1), and a main frame (2), wherein the auxiliary frame (1) and the main frame (2) are combined together through a main connecting frame (3);

the auxiliary frame (1) comprises three central shaft legs (101); one end of the auxiliary frame (1) is interpenetrated with the main connecting frame (3); the auxiliary frame (1) is able to move back and forth in an m-axis direction; a Y-shaped supporting frame (4) configured to ensure stiffness and posture of the auxiliary frame (1) is mounted at another end of the auxiliary frame (1); the main frame (2) comprises three main frame legs (201); the main frame (2) and the main connecting frame (3) are configured to adjust an unfolding angle (θ) through a rotating member (5); the main frame (2) completes extension and retraction states through an outwards pulled buckle lock (6); and the three central shaft legs (101) are uniformly arranged on outer sides of the three main frame legs (201).

2. The combined tripod according to claim 1, wherein each main frame leg (201) comprises a plurality of telescopic legs (202) that coaxially sleeve each other and are able to extend and retract in a lengthwise direction of each main frame leg (201); intersections of adjacent telescopic legs (202) are connected by the outwards pulled buckle lock (6);

a bottom end of each of the telescopic leg (202) at a bottommost end is sleeved with a tube foot (203); and a top end of each of the telescopic leg (202) at a topmost end is movably connected to the main connecting frame (3) through the rotating member (5).

3. The combined tripod according to claim 2, wherein the outwards pulled buckle lock (6) comprises an integrated elastic outer ring (604); the integrated elastic outer ring (604) sleeves end (a) of each telescopic leg (202); the integrated elastic outer ring (604) comprises an elastic band (605); an elastic band fulcrum bulge (6051) configured to be tightened with a pulled buckle arm (606) and to fasten the telescopic leg (202) is arranged at the elastic band (605); and sliding slots (607) are symmetrically provided on the outwards pulled buckle lock (6) corresponding to the elastic band fulcrum bulge (6051).

4. The combined tripod according to claim 3, wherein a front pulled buckle arm (606a) is arranged at one end, adjacent to the elastic band fulcrum bulge (6051), of the pulled buckle arm (606); a pulled buckle shaft hole (606b) is provided on the front pulled buckle arm (606a); a pulled buckle tail (606c) is arranged at one end of the pulled buckle arm (606) away from the elastic band fulcrum bulge (6051);

the pulled buckle shaft hole (606b) is threaded through the sliding slot (607) through a rotating shaft; and a sliding stop (404) for preventing the telescopic legs (202) from being separated from each other is arranged on an outer surface of one end of each telescopic leg (202) away from the outwards pulled buckle lock (6).

5. The combined tripod according to claim 4, wherein three wedge-shaped holes (301) are distributed on the main connecting frame (3), and the three central shaft legs (101) are respectively threaded into the three wedge-shaped holes (301) in a one-to-one correspondence manner;

wedge-shaped sheets (302) are mounted in the wedge-shaped holes (301); an outer circumference of the main connecting frame (3) is rotatably sleeved with a ring sleeve (303); the wedge-shaped sheets (302) are slidably connected to an inner wall of the ring sleeve (303); and the ring sleeve (303) is rotated to lock and release the three central shaft legs (101) through the wedge-shaped sheets (302).

6. The combined tripod according to claim 5, wherein the Y-shaped supporting frame (4) is mounted among the three central shaft legs (101); each edge of the Y-shaped supporting frame (4) is embedded with a safety tail plug (102) of each of the three central shaft legs (101) to provide auxiliary supporting and location limiting effects on the auxiliary frame (1); and the Y-shaped supporting frame (4) is provided with abutment threads (401) that are abutted with the main connecting frame (3), so that the auxiliary frame (1) is used as an independent tripod.

7. The combined tripod according to claim 6, wherein the three central legs (101) are able to be inserted into side gaps (204) between the three main frame legs (201), so that the three central shaft legs (101) and the three main frame legs (201) are closely arranged in a staggered manner.

8. The combined tripod according to claim 7, wherein each of the three rotating members (5) is connected to a ratchet (305) through a pin shaft (501); a pawl wrench (502) is placed in each rotating member through the pin shaft (501); a coaxial torsion spring (503) is further placed on the pin shaft to maintain a working position of the pawl wrench; a bush notch (208) that is inserted with a bush bulge (603) is arranged at end (a) of each telescopic leg (202); the bush bulge (603) is arranged on a bush (601); and bush seams (602) and the bush bulges (603) symmetric to and staggered from the bush seams are provided on the bush (601).

* * * * *